March 15, 1960    J. H. RAMSEY    2,928,123
PLASTIC MATERIAL EXTRUSION HEAD
Filed Sept. 19, 1958    2 Sheets-Sheet 1

INVENTOR.
JUSTIN H. RAMSEY
BY
*Alfred W. Vibber*
ATTORNEY

March 15, 1960 J. H. RAMSEY 2,928,123
PLASTIC MATERIAL EXTRUSION HEAD
Filed Sept. 19, 1958 2 Sheets-Sheet 2

INVENTOR.
JUSTIN H. RAMSEY
BY
Alfred W. Vibber
ATTORNEY

United States Patent Office 2,928,123
Patented Mar. 15, 1960

2,928,123

PLASTIC MATERIAL EXTRUSION HEAD

Justin H. Ramsey, Ramsey, N.J.

Application September 19, 1958, Serial No. 761,994

3 Claims. (Cl. 18—13)

This invention relates to apparatus for extruding plastic material, and more particularly relates to an extrusion head for such apparatus.

It is among the objects of the present invention to provide an improved extrusion head for plastic material extruding apparatus.

A further object of the invention is a provision, in a plastic material extruding head, of an improved combination of a strainer or breaker plate and of passages in the head leading to and away from such plate, the passages and the plate being of such configuration as to facilitate the flow of plastic material through the head.

A further object lies in the provision, in a plastic material extrusion head, of a breaker plate and passages leading to and away from such plate of such construction that voids are virtually eliminated in the plastic material issuing from the breaker plate, and that the plastic material is substantially uniformly treated throughout its extent.

Still another object of the invention resides in the provision of a novel, improved breaker plate of such construction as to treat the plastic material passing therethrough uniformly throughout its active area, including the borders of such active area.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views.

The breaker plate and the plastic material conducting passages in advance of and at the rear thereof which are the subject of the present invention are shown herein incorporated in a plastic material extruding apparatus provided with a cross-head for the sheathing of a continuous core such as a cable. It will be understood, however, that in accordance with the broader aspects of the invention, such invention may be employed to advantage with extruding machinery having other types of delivery heads such as a straight delivery head.

Figure 1:
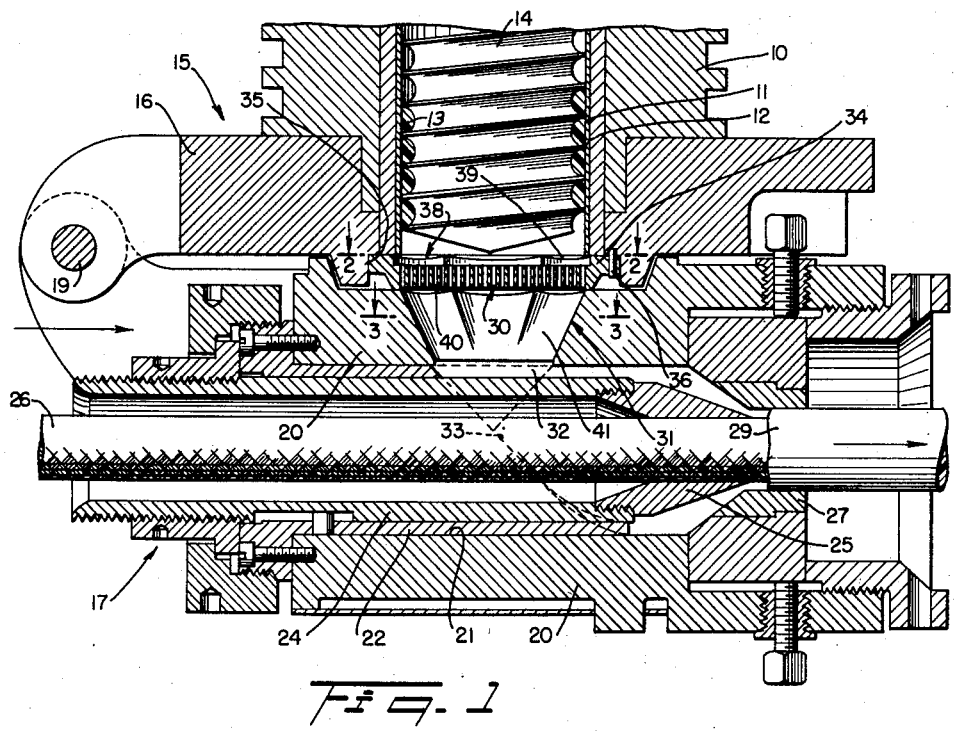
Fig. 1 is a fragmentary view in axial section through a portion of the barrel of a plastic material extending machine and of a cross-head attached thereto, certain of the parts being shown in elevation.

In Fig. 1 there is shown a portion of a screw-type plastic material extruding machine having a barrel 10 provided with a hardened liner 11 within the bore 12 of which a driven plastic material working and forwarding screw 14 rotates. The plastic material 13 forwarded by screw 14 is caused to flow continuously under pressure by the action of the screw into a cross-head generally designated 15 which is secured by means (not shown) to the forward end of barrel 10.

Cross-head 15 is made up of a first fixed part 16 attached to barrel 10 and of a second part 17 attached to part 16 by a pivot pin 19 at the rear ends of such parts and by means (not shown) such as studs connecting parts 16 and 17 together at their forward ends. Part 17 of the head has a body portion generally designated 20 through which there is a longitudinally extending bore 21, the axis of which lies in the plane of the axis of bore 12. Snugly fitting within bore 21 is a spacer tube 22 which may be substantially identical with tube 24 shown in Van Riper Patent No. 2,760,230. Spacer tube 22 is affixed to body 17 by having the enlarged outwardly flanged rear end of the tube secured thereto by studs as shown. Snugly fitting within spacer tube 22 is an inner or guider tube 24 which is affixed to body 20 by a first or adjusting nut screwed on the rear end thereof and abutting the rear flanged end of tube 22, and by a second or outer retaining nut screwed to the flanged end of tube 22. Such structure, which forms no part of the present invention, is fully described in Van Riper Patent No. 2,760,230.

Tube 24 carries on its forward end a core guide 25 which snugly receives therewithin the elongated core member 26, such as the core of an electrical cable, which is to be sheathed by the apparatus. Body 20 carries on its forward end a die 27 which defines the thickness and shape of the plastic sheath on the sheathed product 29 issuing from the head. It will be understood that during operation of the apparatus plastic material fed by screw 14 enters the chamber in body 20 of the head through an opening 32 therein, and that it is deflected by the plastic material diverting end 33' of spacer tube 22 so that it continuously flows forwardly about guide tube 24, over the core guide 25, and out the die 27 to form a sheath on core 26 as the latter travels through the head.

As above indicated, the present invention is concerned with the novel configuration and disposition of a strainer or breaker plate interposed between the end of screw 14 and the chamber in the extrusion head, and also with the configuration and disposition of the passages leading to and away from the breaker plate. The breaker plate, generally designated 30, has an annular marginal portion 34 which is received in an annular recess 35 in portion 16 of the head, the recess lying coaxial of bore 12 in the barrel. The breaker plate is retained from rotation, when the parts of the head are in operative position as shown in Fig. 1, by a short pin 36 the ends of which are positioned in a recess in the margin of the breaker plate and in body 16 of the head. The central, active portion 37 of the breaker plate, which is in the form of a regular hexagon, is provided with a plurality of equally spaced identical small circuilar cylindrical holes 40 therethrough. The outer rows of holes 40 are disposed spaced inwardly of and parallel to the respective sides of the hexagonal zone 37, the latter space being equal to that between holes 40. The "active" portion of the breaker plate may be defined as that portion which is subjected to plastic material under pressure during the operation of the extruding apparatus.

Breaker plate 30 has a central recessed portion bounded by an upper border 28 in the form of a circle slightly exceeding bore 12 in diameter. Symmetrically located within such border 28 and coaxial of bore 12 is the above-discussed active plastic material-conducting area or portion 37 of regular hexagonal shape. Portion 37 is more clearly shown in Figs. 2 and 4. As seen in such figures, the apices of the hexagon lie on the circular border 28, and the sides of the hexagon are spaced varying distances from margin 28 so that in plan (Figs. 2 and 4) the zones 39 appear as segments of a circle. In actuality, surfaces 39 are curved and taper somewhat downwardly (Fig. 1), being formed by the gradual blending of the sides of the short passage in the breaker plate from a circle at its top to a hexagon at its bottom.

Figure 3:
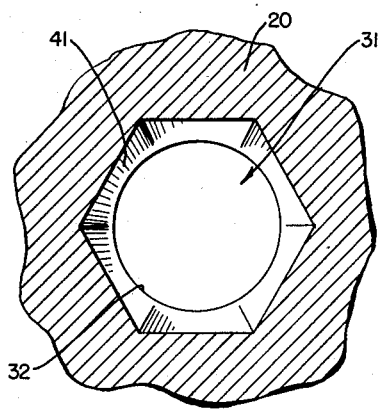
Fig. 3 is a fragmentary view in section through the extrusion head in the vicinity of a plastic material conducting passage therein beyond the exit end of the breaker plate, the section being taken along the line 3—3 of Fig. 1.

Below breaker plate 30 body 20 is provided with a downwardly (Fig. 1) tapering passage 31 the sides 41 of which, as more clearly shown in Fig. 3, are formed by gradually blending or merging the hexagonal shaped larger upper end of passage 31, which is of the same size and shape, and has the same orientation in space, as active portion 37 of the breaker plate, into a smaller circle at opening 32 at the end of passage 31 adjacent the chamber in the head.

It will thus be seen that the plastic material 13 forwarded by screw 14 in a short portion thereof, outwardly of the end of screw 14 is in the form of a short circular cylindrical rod or disk having the same diameter as bore 12 and disposed coaxial therewith. As the material in such disk travels toward the breaker plate, the configuration thereof is gradually changed by the surfaces 39 from a circular to a straight walled formation, so that the rod or column of plastic material immediately in advance of the active portion 37 of the breaker plate is of hexagonal cross section. Such material is divided into identical small parallel equally spaced cylindrical rods as it passes outwardly through the spaced circular cylindrical holes 40 in the breaker plate. During such passage of the plastic material through the holes 40 in the breaker plate, it progresses at an increased speed, the plastic material decelerating immediately after it has left the breaker plate. In the initial part of passage 31, such passage has the same effective cross-sectional area and shape as the portion of the entering passage immediately above area 37 of the breaker plate. Consequently, the plastic material issuing from the breaker plate immediately tends to assume the most efficient arrangement for the packing of the rods passing through holes 40, that is, each such rod tends to become hexagonal in shape, the rods in the aggregate interfitting and combining to fill the entering end of passage 31. Thus the plastic material at the entering end of passage 31 is in the form of a hexagonal rod of large cross section. As such rod travels along passage 31, it is gradually changed in shape until it assumes the shape of a short circular cylindrical rod at opening 32 into the chamber in the head.

The apparatus of the present invention thus causes the plastic material to flow smoothly, changing first from a large circular cylindrical rod to a large hexagonal rod, following which it is divided into a plurality of cylindrical rods having a total area less than that of the entering hexagon, and after which the rods are recombined while flowing forwardly into a hexagonal shape of the same area and configuration as the entering hexagon. Beyond this, the second hexagonal rod is changed into a smaller circular cylindrical rod prior to the entry of the plastic material into the chamber proper of the extruding machine. As a result of such flow of the plastic material, it is thoroughly and substantially uniformly worked while being subjected to a flow path which substantially eliminates the formation of voids and/or stagnant zones in the plastic material.

The apparatus of the present invention overcomes difficulties which have long been experienced with conventional extruding apparatus wherein the breaker plate has a plurality of spaced holes and the head confines the plastic material entering and leaving the breaker plate by circular walled passages. Such conventional construction produces substantially dead spots of varying and unpredictable extents in the flow area of the plastic material. In contrast thereto, the apparatus of the present invention produces a substantially uniform flow of the plastic material before, during, and after its passage through the breaker plate, and as noted, substantially eliminates voids and/or stagnant zones in the plastic material.

Figure 2:
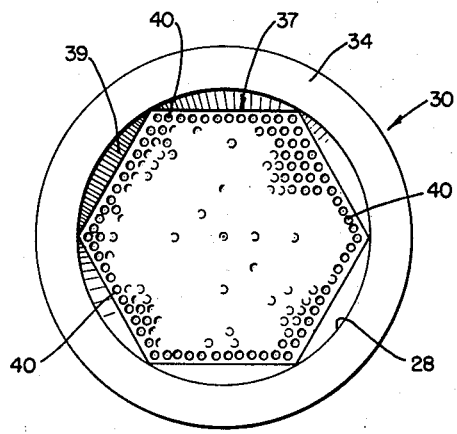
Fig. 2 is a view in plan of the strainer or breaker plate employed in the apparatus of Fig. 1, the section being taken along the line 2—2 of Fig. 1.
Figure 4:
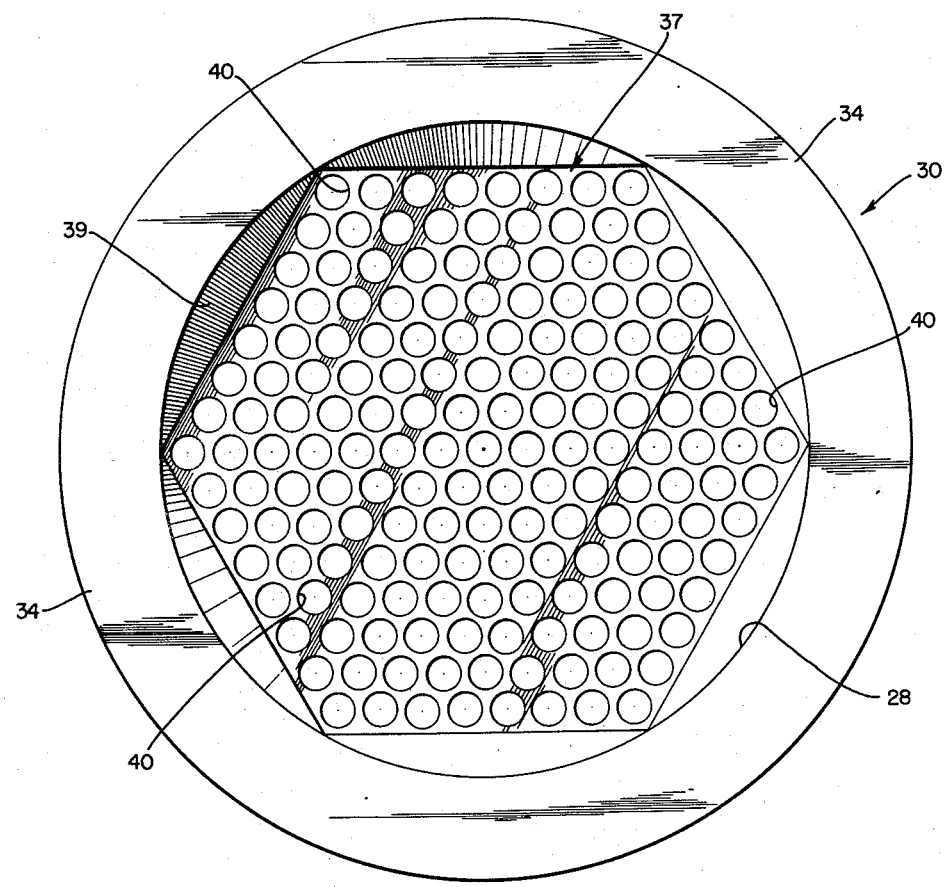
Fig. 4 is an enlargement of Fig. 2, and shows the openings in the breaker plate throughout the entire active area of such plate.

A consideration of Figs. 2 and 4, particularly the latter figure, will show why the breaker plate and the passages in the extrusion head leading to and away from the breaker plate produce such improved results. The holes 40 in the breaker plate are identical, and are spaced uniformly over the active area 37 of the plate not only from each other but also from the edges or borders of such active area. It will be seen that when the holes 40 are thus arranged successive rows thereof are staggered, and that each (first) hole 40 (except along the edges of the active portion of the plate) is surrounded by six (second) holes 40 each of which is spaced equal distances from the first hole and its two neighboring second holes. The resulting active portion 37 of the breaker plate is as uniform, from zone to zone thereof, as is possible in a multi-perforated plate: the holes 40 are equally spaced, and the webs of the breaker plate between the holes 40 are all symmetrical and similar. The breaker plate thus functions in a uniform manner from zone to zone, over the inner area of its active portion. Not only this, but the outer marginal holes, adjacent the hexagonal border of the active area 37 are spaced from the hexagonal margin of the active portion of the breaker plate of the invention a distance which is equal to the distance between the holes 40. The treatment of plastic material passing through the marginal holes of the breaker plate thus closely approximates the treatment given such material passing through holes further inwardly from the margin of the plate. As a result, as pointed out above, the apparatus of the invention is distinguished by the uniformity of its treatment of the plastic material, and by the absence of voids or stagnant zones in the plastic material as it is worked by the apparatus.

Although only one embodiment of the invention has been illustrated in the accompanying drawings and described in the foregoing specification, it is to be expressly understood that various changes, such as in the type of plastic material extruding head with which the invention is employed may be made without departing from the spirit and scope of the invention as will now be apparent to those skilled in the art.

This application is a continuation-in-part of application Serial No. 671,240, filed July 11, 1957.

What is claimed is:

1. Apparatus for extruding continuous lengths of plastic material which comprises means for subjecting such material to pressure to cause it to flow longitudinally, a first means having a passage to confine laterally the thus flowing plastic material so as progressively to shape it into a first circular cylindrical rod of relatively large diameter, a second means beyond the first means having a passage for progressively changing the first rod into a second rod of regular hexagonal cross section coaxial of the first rod, a breaker plate interposed in the path of travel of the plastic material beyond the second means, said breaker plate being provided with a plurality of identical equally spaced circular cylindrical holes whereby to divide the second, hexagonal rod into a large number of short longitudinally travelling parallel third rods, a third means beyond the breaker plate having a passage for recombining the material in such third rods, while such material continues to travel longitudinally, into a fourth rod of regular hexagonal cross section, the outer, bounding row of holes in the breaker plate lying the same distance from the projected boundary of the second rod as from each other, the holes in the breaker plate being disposed in the form of a regular hexagon, the exit end of the passage of the second means and the entrance end of the passage of the third means having transverse sections in the form of similarly oriented substantially identical regular hexagons.

2. Apparatus as defined in claim 1, wherein the first, second, and fourth rods are coaxial.

3. Apparatus as defined in claim 2, wherein the diagonal of each of the regular hexagonal sections of the second and fourth rods substantially equals the diameter of the circular first rod.

References Cited in the file of this patent

UNITED STATES PATENTS

| | | |
|---|---|---|
| 2,636,218 | Orsini | Apr. 28, 1953 |
| 2,728,943 | Hertz et al. | Jan. 3, 1956 |
| 2,760,230 | Van Riper | Aug. 28, 1956 |